Oct. 6, 1931.  C. J. BOCK  1,826,380
FRONT BRAKE CONTROL SHAFT
Filed Feb. 6, 1928  2 Sheets-Sheet 1
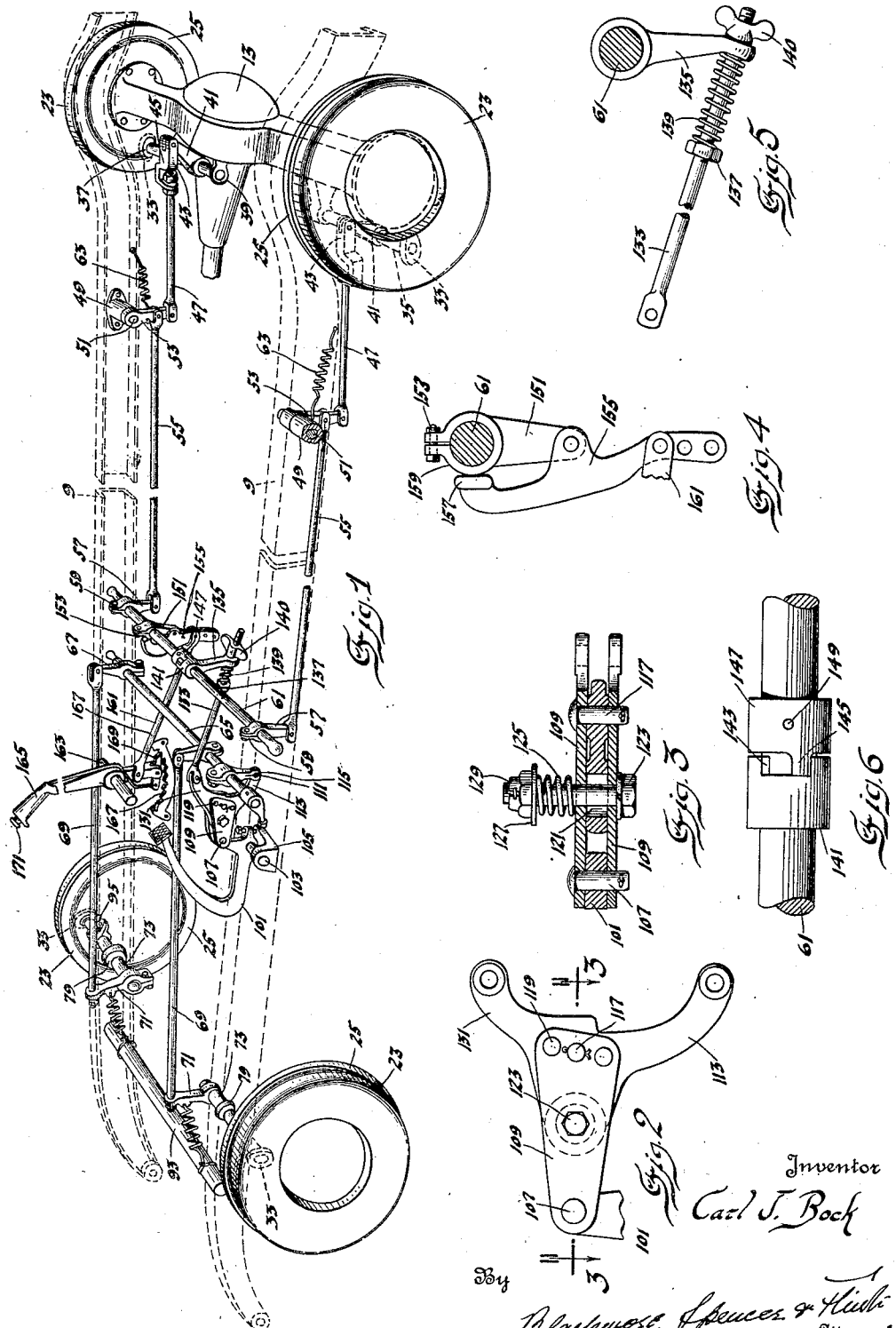
Inventor
Carl J. Bock
By
Blackmore, Spencer & Hulbert
Attorneys Oct. 6, 1931.  C. J. BOCK  1,826,380

FRONT BRAKE CONTROL SHAFT

Filed Feb. 6, 1928  2 Sheets-Sheet 2

Inventor
Carl J. Bock
By Blackmore, Spencer & Flint
Attorney

Patented Oct. 6, 1931

1,826,380

UNITED STATES PATENT OFFICE

CARL J. BOCK, OF PONTIAC, MICHIGAN, ASSIGNOR TO YELLOW TRUCK AND COACH MANUFACTURING COMPANY, OF PONTIAC, MICHIGAN, A COMPANY OF MAINE

FRONT BRAKE CONTROL SHAFT

Application filed February 6, 1928. Serial No. 252,253.

This invention relates to brakes and has been designed as an improved system of brake operating mechanism for vehicles and is intended to operate both front and rear wheel brakes.

Among the objects of the invention may be mentioned an improved equalizing mechanism for use between the front and rear brakes; an improved means for an interconnection of two independent manually operating means; a single adjusting mechanism for all the brakes; a novel arrangement for the part of the hook-up relating to the front wheel brake whereby a much cleaner appearing front wheel operating mechanism is effected and also an improved operation. Other objects and advantages will be understood from a reading of the following specification and from an examination of the accompanying drawings.

In the drawings:

Figure 1 is a perspective of the brake applying mechanism as a whole associated with a vehicle chassis.

Figure 2 is a view in elevation of a novel equalizer.

Figure 3 is a section on line 3—3 of Figure 2.

Figure 4 is a view in elevation of a lost motion or nut cracker type of connection associated with the rear rock shaft and the emergency brake lever.

Figure 5 is a detail in elevation of the connecting means between the equalizer and the rear rock shaft.

Figure 6 is a top plan view of a detail.

Figure 7:
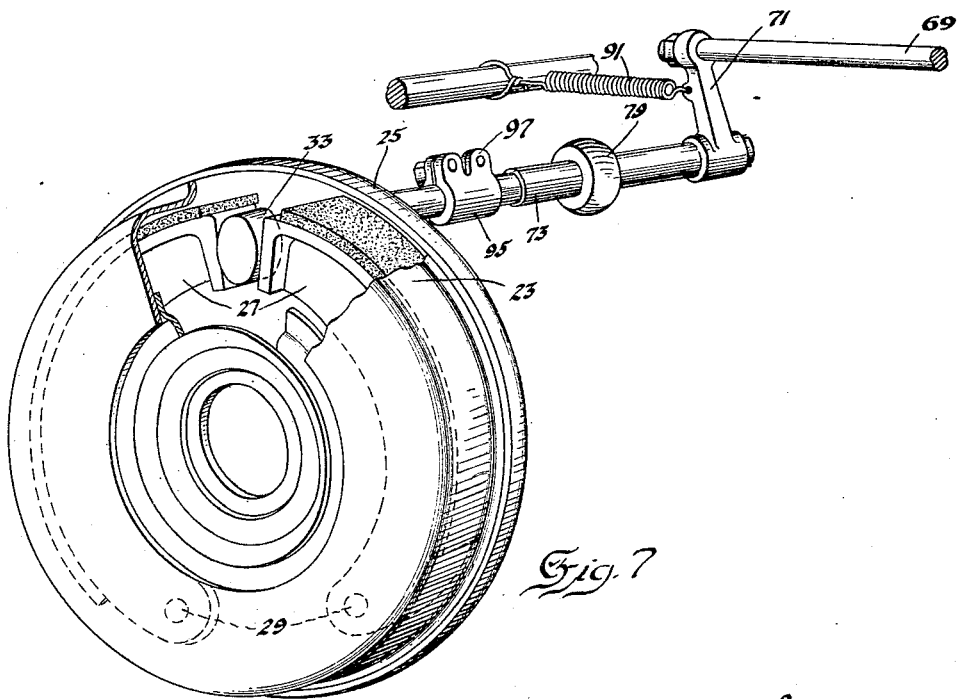
Figure 7 is a perspective of the hook-up as applied to the front wheel brake.

Referring by reference characters to the several figures of the drawings, numeral 9 is used to represent any suitable chassis frame member supported above a front axle 11 and a rear axle 13, the usual supporting springs being omitted from the drawings. The wheels are mounted as usual, the front wheel 15 being rotatable upon a spindle 17 constituting a part of a steering knuckle 19, the latter being forked as at 21 and pivoted to the end of the axle. Parts 20 and 22 are associated with the steering knuckle and have to do with the steering system and are not related to this invention. Wheels 15 and also the rear wheels are provided with drums 23 secured thereto. Closing the drums are rigid plates 25, commonly known as backing plates. These plates are secured, in the case of the rear wheels, to the axle housing, and in the case of the front wheels they are secured to the steering knuckle 19. Within the enclosure formed by the drum 23 and the backing plate 25 is the brake mechanism. This brake mechanism may be of any desired type, there being shown for the purpose of illustration a shoe brake comprising two shoes 27 pivoted at 29 to the backing plate. The shoes are segmental in shape and provided with linings as usual to frictionally engage the inner wall of the drum. Their adjacent ends, remote from the anchors, are shaped to be engaged by a cam 33. No novelty is being claimed for this brake per se.

At each end of the rear axle the cam 33 for the wheel brake is carried by a shaft 35 journalled at 37 in the backing plate and at 39 in a bracket on the axle. The shaft 35 has an upwardly directed arm 41 to which is pivoted the forked end 43 of a fitting 45, the opposite and front end of which has attached thereto a forwardly extending rod 47. On each side frame member 9 forwardly from the rear end is a journal bracket 49 for rotatably mounting a short rock shaft 51. The rock shaft 51 has a depending arm 53. Rod 47 is pivoted to the lower end of the arm 53. Just above its pivotal point of connection with rod 47 the arm 53 is pivoted to the rear end of the forwardly extending rod 55. The two rods 55, one on each side of the vehicle, are connected to arms 57 depending from and rigidly clamped as at 59 to a rock shaft 61 journalled in any suitable way to the side frame bars 9. Associated with arms 53 are coil springs 63. Each of these springs is attached at one end to its arm 53 and at its other and rear end is anchored to the frame. The function of this spring is to ensure the releasing of the rear brakes.

Parallel to and forwardly of rock shaft 61 and similarly mounted in the frame is another rock shaft 65. Within the frame bars shaft 65 carries rigidly clamped thereto upwardly directed arms 67, from which extend forwardly rods 69, one for each front brake. Each of these rods 69 is connected to an upwardly directed arm 71 clamped to a rock shaft 73 for rotating cam 33 of a front wheel brake.

Figure 8:
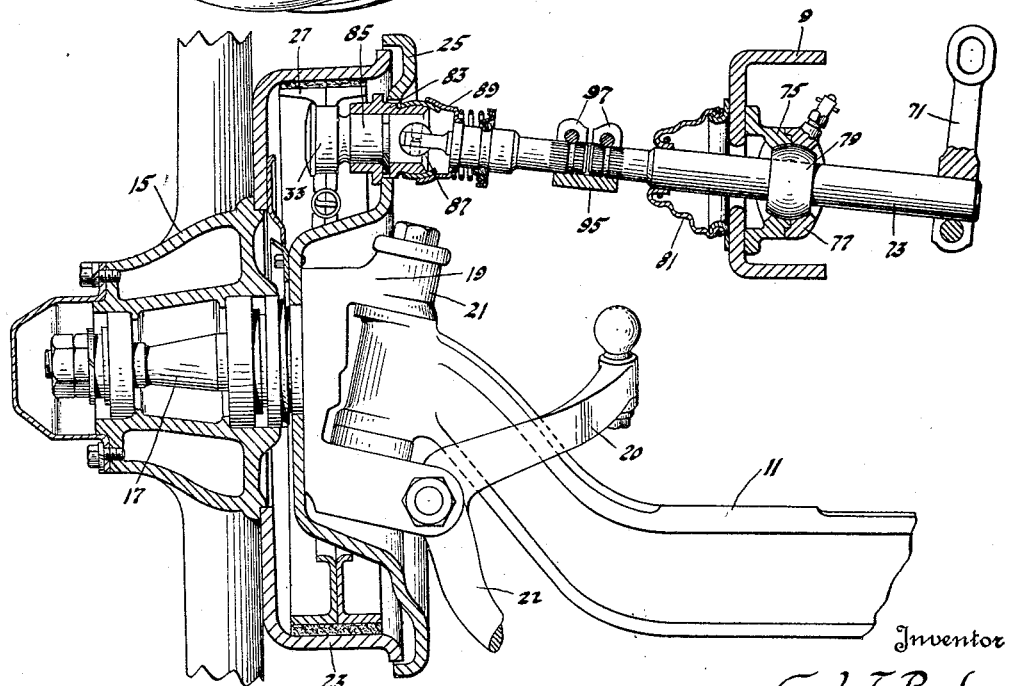
Figure 8 is a view in elevation, partly in section, of the same.

The operating mechanism for the front wheel brake is best shown in Figures 7 and 8. Frame 9 carries a ball socket member 75 cooperating with which is a separable member 77, the two parts 75 and 77 seating a ball 79 through an opening in which is slidably and rotatably mounted the rock shaft 73, upon which the arm 71 is mounted. Outside the frame a bellows-like dust guard, of leather or the like, 81 may be secured to the frame and to the shaft. In the backing plate 25 is secured in any convenient way a bracket 83 apertured to rotatably carry the shaft 85 upon which shaft is the cam 33. This shaft 85 is provided with a universal joint as at 87 substantially over the swivelling axis between the front axle 11 and the steering knuckle 19, whereby the steering of the front wheels is permitted. Any suitable dust protection as shown at 89 may be used for this joint. At 91 is shown a spring connected to arm 71 and to any suitable anchor, Figure 1 showing a cross bar 93 serving for such an anchor. A convenient means for adjusting the cam is afforded by a two-part clamp 95, clamping together the adjacent ends of shafts 73 and 85. Two clamping bolts 97 permit the rotation of either of said shafts relative to the other.

An important feature of the invention is to be found in the front wheel brake applying mechanism. In prior constructions of this general type a similar rock shaft has been used with an arm extending from the rock shaft downwardly and outside the frame. It is found, however, that it is difficult to so locate such an arm without its interfering with the steering member. If such an arm be directed upwardly it is found that the rotary movement of the front wheel interferes with the intensity of brake application. Also, the prior art shows an arm extending downwardly from a similar rock shaft and located within the mounting for said shaft at the frame. With such an arrangement when the brake is applied to the rotating wheel the cam, being held between the adjacent ends of the shoes is carried a slight extent forwardly in a general circumferential direction. This tends to turn combined shafts 85 and 73 in a counter-clockwise direction. When the arm is downwardly directed the movement described loosens the connection between the arm and the brake applying means, such as the pedal or lever. In the present case the same counter-clockwise movement operates to tighten the brake connection associated with link 69. Such forward and downward movement of the cam and of shafts 85 and 73 tends also to swing the combined shafts about the ball joint at the frame, the region in the vicinity of the arm tending to move rearwardly. This effect is, of course, the same whether the arm extends upward or downward. This rearward movement clearly tends to loosen the brake linkage connected to the arm. In the former arrangement there is, therefore, a double tendency to loosen the connecting means whereas in the present arrangement the tendency to loosen owing to the movement of the shaft about the ball joint is offset by a tendency to tighten owing to the rotation of the combined shafts about their longitudinal axis as the cam is slightly carried forward and downward. There is thus accomplished an ideal arrangement from a functional point of view and a much cleaner front wheel brake applying assembly is provided.

A pedal 101 is pivoted as at 103 to a bracket 105 secured at any convenient position to the chassis. Above its pivot the pedal is pivotally attached as at 107 between a pair of triangular shaped plates 109. Rock shaft 65 carries rigid therewith a downwardly directed arm 111. To the lower end of this arm is pivoted a triangular equalizer bar 113 by pivot pin 115. At a mid point the equalizer is pivoted to the opposed plates 109 by a pin 117. Provision is made for several points of pivotal connection by means of spaced openings 119 in the pair of plates 109. Equalizer 113 projects into the space between plates 109 where it is formed with an enlarged opening 121 for the passage of a pin or bolt 123 of smaller dimension than the opening 121. This pin or bolt 123 is carried by the plates 109. Around the pin 123 and outside the plate 109 is a coil spring 125 in abutment with one plate 109 and with a washer 127 held adjustably by a nut 129, whereby the compression of the spring may be adjusted to control the frictional resistance to the relative movement between plates 109 and the equalizer 113. To the upper end 131 of the equalizer is connected a link 133, said link extending through an aperture in an arm 135 rotatably mounted on shaft 61. Adjustable on the link 133 is a nut 137 between which and arm 135 is an anti-rattling coil spring 139. Wing nut 140 on link 133 serves to adjust all brakes simultaneously.

The collar 141 forming the head of arm 135 is recessed as at 143, and the rotation of the collar is limited by the engagement of the ends of the recess with a lug 145 extending into the recess from a second collar 147 secured as by a pin 149 to the said shaft 61.

Also associated with shaft 61 is an arrangement for operating the brakes of the rear wheels by an emergency lever. To this end an arm 151 is secured by clamping means 153 to the shaft 61. At the lower end of arm 151 is pivoted a lever 155. The lever pivot is at an intermediate point in its length. At its upper end lever 155 is formed with an abutment 157 to engage the collar portion 159 of the arm 151 when the lever swings in a clockwise direction on its pivot with arm 151. A rod or link 161 may be connected to lever 155 at one of a plurality of points as shown in Figure 4. The link 161 extends forwardly and is connected at its front end to the lower end of and beneath the pivot 163 of an emergency lever 165. A notched segment 167 is provided to hold the lever in adjusted position by means of a locking dog 169 mechanically operated as usual by a plunger 171 associated with the emergency lever.

The emergency lever is to operate the rear brakes as stated. As it rotates in a clockwise direction it pulls upon rod 161 and, through the means of lever 155 operatively engaging with shaft 61 by its connection with arm 151 and by its contact at 157, it rocks shaft 61 clockwise and pulls upon rods 55 and applies the rear brakes. Shaft 61 as it rocks carries fixed collar 147, the lug 145 on this collar moving freely in recess 143 in the collar portion of arm 135, whereby the rear brakes may be applied without affecting the front brake linkage, not even rotating arm 135. Considering now the operation of all the brakes simultaneously, when the pedal 101 is depressed it rocks in a counter-clockwise direction, pulling forwardly plates 109 and the equalizer 113 pivoted thereto. This forward movement of the equalizer pulls forward upon arm 111, rocks shaft 65 clockwise and applies the front brakes. Simultaneously the equalizer 131 pulls forwardly upon rod 133 and by means of the lever 135 turns the rear shaft 61 clockwise and applies the rear brakes. Should there be unequal clearance at the front or rear brakes the equalizer 113 swings on its pivot 117 as the brake is being applied to take up the same and permit the pedal pressure to be applied equally upon the two brakes front and rear. This rocking of the shaft 61 rocks its arm 151. Since the emergency lever is not to be moved when shaft 61 is being rocked by the pedal 101, the pivotal connection between the lever 155 and the arm 151 is made use of to prevent the rotary movement of shaft 61 being communicated to the emergency lever. As the shaft rotates the lever 155 swings about its pivotal connection with arm 151 and the contact point 157 swings away from the shaft 61.

The pin 123 passing through the slot 121 is of importance. It not only permits the swinging of the equalizer on its pivot 117 to effect equalized action upon the front and rear brakes but it serves the purpose of a limiting stop in case the front and rear brakes should become ineffective. If, for example, the link 133 should become broken a relative movement of equalizer 113 and the plates 109 would occur, this relative motion being limited by the contact of pin 123 with the wall of opening 121. Thereafter, further pedal movement actuates the plates 109 and the equalizer 113 as if integral and pulling forward the combined elements, rocks shaft 65 and applies the front brakes. Similarly, if anything associated with the front brakes should fail, even if rock shaft 65 should break, the lost motion between 109 and 113 will be taken up by a slight movement of the pedal, after which the rear brakes may be applied. It has been found necessary in the case of a brake operating mechanism having an equalizer of this type to provide an adjustable stop or its equivalent to limit the swinging of the equalizer and to thereby ensure the full release of both brakes controlled by the equalizer. In the absence of such a stop a tendency of one brake to drag owing, for example, to high self-energization or a relatively weak releasing spring, might result in an actual dragging permitted by an abnormal action of the equalizer. It is to prevent such an action that the stop is used. Such a stop device may be conveniently associated with the pin 123. Spring 125 surrounding the pin or bolt 123 produces sufficient friction between the parts 109 and 113 to cause these parts to normally move together. There is, however, sufficient yieldability in the spring as to permit the equalizer to move relatively to plates 109 when the brake is applied to ensure equal pressure upon the brakes, front and rear. It also offers sufficient resistance to prevent equalizer 113 from turning relative to plates 109 when the brakes are released and thereby ensures complete release of both brakes and prevents dragging of the shoes upon either one of the drums.

The location of arm 71 of the shaft 73 within the frame is advantageous in that it removes arms 73 from the outside where similar arms are frequently used, this location making a cleaner appearance. The inner location also avoids interference from contact with steering members, it being understood that to avoid the effects upon the intensity of brake application caused by the two movements of shafts 83 and 85 it would be necessary to have the arm 71, if used outside the frame, downwardly projected into the region of the steering linkage.

I claim:
1. In a brake, a first brake operating rock shaft, a second brake operating rock shaft, an arm on each rock shaft, an equalizer pivoted to one rock shaft arm, a link connecting said equalizer to the other rock shaft arm, a manually operable lever, means pivotally connected to said manually operable lever and to said equalizer, said means and said lever having, in addition to the pivotal connection, a lost motion connection whereby the means and the lever may act at times as a unitary member.

2. The invention defined by claim 1, said lost motion connection between said equalizer and the means connecting said equalizer with said manually operable lever comprising a pin carried by one of said parts and movable in an opening in the other of said parts.

3. The invention defined by claim 1, said lost motion connection between said equalizer and said means connecting the equalizer with said manually operable lever comprising a pin carried by one of said parts and movable in an opening in the other of said parts, together with a resilient member normally restraining relative movement of said connecting means and said equalizer.

4. The invention defined by claim 1, said lost motion connection between said equalizer and the means connecting said equalizer and said manually operable lever comprising a pin carried by said connecting means and movable in an opening in said equalizer together with resilient means associated with said pin normally restraining said equalizer and connecting means from relative movement, permitting movement of said parts for the purpose of equalization, and further acting to ensure the release of both brakes by resisting relative movement between said parts.

5. Operating means for brakes, comprising a first brake shaft and a second brake shaft, each rotatable to actuate brakes, equalizing means between said shafts, manually operable means to move both said shafts through the instrumentality of said equalizer, independent manually operable means to rock the second shaft and apply the brakes associated therewith, the connection of the equalizer with said last mentioned second shaft including a lost motion device whereby the rotation of the second shaft by the independent manually operable means will not rock the first shaft, said lost motion connection including an arm on the second shaft, a connection between said arm and said equalizer, the arm having a collar rotatable on the second shaft, the collar having an axial recess, a second collar secured to said second shaft adjacent the first collar, said second collar having a lug projected into said recess.

6. Brake operating mechanism comprising a first brake shaft, and a second brake shaft, an equalizer connected to said shafts, a first manually operable means to move said equalizer and through the instrumentality of said equalizer to equally apply the brakes associated with said two shafts, a second manually operable member, a connection between said second member and said second shaft, said connection having a lost motion connection with said second shaft comprising an arm rigid with the shaft, a lever pivoted intermediate its length to said arm, said connection being pivoted to said lever on one side of the pivot of the lever, the lever on the other side of its pivot engaging an abutment on said shaft.

7. A vehicle having front and rear sets of brakes and having, in combination therewith, a rockshaft operating each set of brakes, each of said rockshafts having a generally vertical operating arm, a vertical equalizer bar connected at one end to one of said arms and extending vertically past the corresponding rockshaft, a connection from the other end of the equalizer bar extending past said corresponding rockshaft to the arm on the other rockshaft, an operating lever, and a connection from said lever to the central part of the equalizer bar, said connection being so constructed and arranged as to insure operation of at least one of said rockshafts despite the failure of the connection with the remaining rockshaft.

8. A brake mechanism comprising, in combination, an equalizer bar having separate tension means connected to each end thereof, an actuating link connected to the bar intermediate said ends, the connection between said bar and link being so constructed as to insure actuation of at least one of said tension means upon failure of the other.

9. A brake structure comprising an equalizer bar, together with a fitting pivoted thereto, which fitting is so constructed as to act as a double stop to determine the movement of said bar about said pivot.

In testimony whereof I affix my signature.

C. J. BOCK.